United States Patent [19]

Zeis

[11] 4,417,358
[45] Nov. 22, 1983

[54] AMPLITUDE MODULATED TRANSMITTER FOR SINGLE SIDEBAND OPERATION

[75] Inventor: Jürgen Zeis, Berlin, Fed. Rep. of Germany

[73] Assignee: Licentia Patent-Verwaltungs GmbH, Frankfurt am Main, Fed. Rep. of Germany

[21] Appl. No.: 314,046

[22] Filed: Oct. 22, 1981

[30] Foreign Application Priority Data

Oct. 23, 1980 [DE] Fed. Rep. of Germany ....... 3040272

[51] Int. Cl.³ .............................................. H04B 1/02
[52] U.S. Cl. ................................... 455/109; 455/116; 455/127; 330/297
[58] Field of Search ................. 455/47, 108, 109, 116, 455/127; 332/45; 330/296, 297

[56] References Cited

U.S. PATENT DOCUMENTS

| 2,900,459 | 8/1959 | Olive | 455/109 |
| 3,413,570 | 11/1968 | Bruene et al. | 455/108 |
| 3,486,128 | 12/1969 | Lohrmann | 455/108 |
| 3,564,417 | 2/1971 | Kurusu | 455/109 |

FOREIGN PATENT DOCUMENTS

| 107806 | 6/1927 | Austria . | |
| 947985 | 2/1956 | Fed. Rep. of Germany . | |
| 950788 | 10/1956 | Fed. Rep. of Germany . | |
| 1218557 | 12/1966 | Fed. Rep. of Germany . | |

OTHER PUBLICATIONS

Lehrbuch der Funkempfangstechnik I (Radio Receiving Textbook), 3rd Edition, 1959, by Dipl.-Ing. Helmut Pitsch. Section 292.

Primary Examiner—Jin F. Ng
Attorney, Agent, or Firm—Spencer, Kaye & Frank

[57] ABSTRACT

In a transmitter of amplitude modulated single sideband signals, which transmitter includes an output stage connected to receive, and effect substantially linear amplification of, a single sideband input signal, the output stage having a nonlinear gain characteristic, and a reactance network tuned to the single sideband frequency and connected to the output of the output stage, the transmitter is further provided with a control system connected to the output stage for controlling the current flow angle at the output stage output in a manner to increase the current flow angle as the amplitude of the input signal decreases, and the control system is constructed and connected for controlling the output current flow angle in a substantially synchronous, undelayed and hysteresis free manner as a function of the envelope of the single sideband input signal and for varying the output current flow angle down to values corresponding to class C amplifier operation for the highest single sideband input signal amplitude.

9 Claims, 6 Drawing Figures

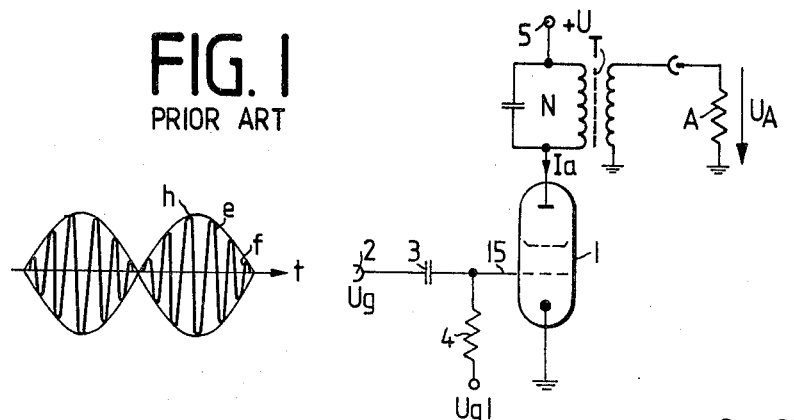
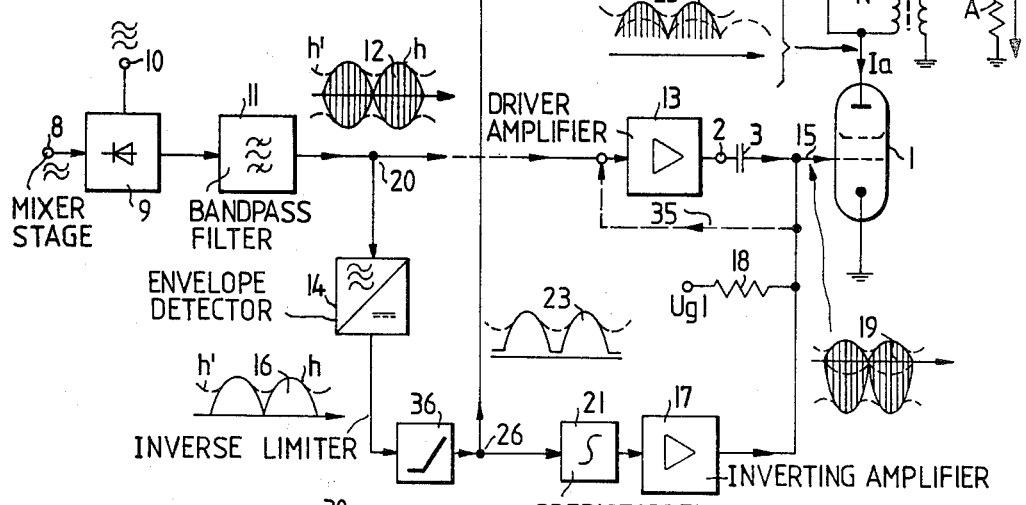
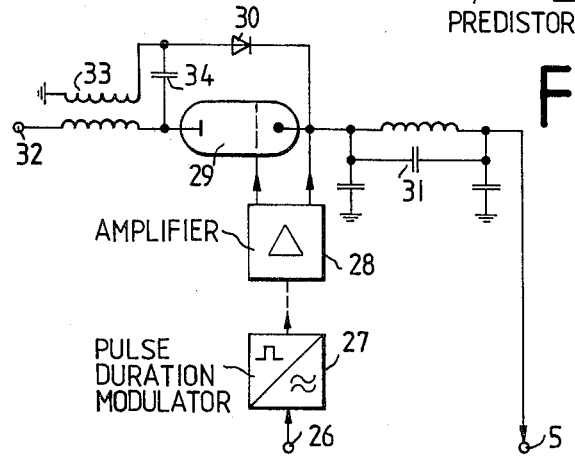

AMPLITUDE MODULATED TRANSMITTER FOR SINGLE SIDEBAND OPERATION

BACKGROUND OF THE INVENTION

The present invention relates to a single sideband, amplitude modulated transmitter of the type requiring an output stage that linearly amplifies the controlling carrier frequency single sideband. For this purpose, for example, a transmitting tube used as the output stage should actually operate in the class B mode and have a linear $Ug_1/Ia$ characteristic curve.

Since it is desirable to reduce the power loss occurring in such output stage, the proposal has already been made, as disclosed in German DE-OS 1,766,586 and corresponding U.S. Pat. No. 3,413,570, to modulate the output tube anode voltage at the same time so that such voltage is reduced when there is a small modulation at the control grid. It has also been attempted to avoid the then occurring distortions, as disclosed in U.S. Pat. No. 3,486,128, by varying the collector voltage of a transistor (corresponding to the aforementioned anode voltage comodulation) in accordance with the difference between the envelope curves at the output, on the one hand, and at the input, on the other hand, of the output stage. The effect of such envelope feedback, however, has been found to be insufficient because the control circuit gain cannot be driven to the actually required degree because of the tendency to oscillate.

For audio frequency amplifiers an additional way to reduce power loss is disclosed in lehrbuch der Funkempfangstechnik I [Radio Receiving Textbook], 3rd edition, 1959, by Dipl.-Ing. helmut Pitsch, at Section 292. This publication relates to the class AB amplifier in which the operating point for small modulations is placed so as to produce a smaller anode current than for class A amplifiers so that the power loss will be less than in the class A amplifier with a still relatively low distortion factor for small modulations. With greater modulations, the operating point shifts in the direction toward class B operation due to a drop in the D.C. voltage occurring during the modulation across one cathode resistor as a result of a rectified current due to a partial rectification which occurs in class B operation. The D.C. voltage drop across the cathode resistor is utilized as a negative grid bias to shift the operating point. Since in class B operation the negative half-wave is suppressed, or clipped, for large modulations, such a class AB amplifier must be operated in a push-pull arrangement in order to keep the distortion within limits. To improve the remaining distortion factor, a relatively long time constant of 0.15 second is proposed for the parallel connection of the cathode resistor (e.g. 200 ohms) with a bridging capacitor (of e.g. 750 uF).

This known class AB audio frequency amplifier, compared to a class A amplifier, is intended mainly to reduce the power loss by shifting the operating point in the direction toward class B operation with large modulations with a delayed return to class A operation during small modulations, the delay being effected by means of the cathode resistor/capacitor combination. A worsening of the distortion factor is intentionally taken into consideration here and is reduced again by the push-pull operation and by special design rules for the cathode resistor/capacitor combination. Such a circuit cannot be used for the output stage of a single sideband transmitter for several reasons:

First, a push-pull arrangement is too expensive for a transmitter output stage.

Additionally, although there exist special single sideband high frequency tubes for class B operation which have a grid voltage/anode current characteristic curve approximating a straight line as much as possible, the use of such a tube brings about distortions in the envelope curve of the amplified single sideband signal of such a magnitude that no further distortions can be accepted in connection with the effort to reduce power loss. This applies particularly to the use of an output tube having a curved characteristic that has not been approximately linearized especially for single sideband operation.

The method of reducing power losses by using a class AB amplifier is therefore unsuitable for a single sideband transmitter because it would always bring about additional distortions. It would also not be possible to eliminate these distortions again by special selection of the cathode resistor/capacitor combination since this combination in particular produces additional distortions during the amplification of the single sideband in that the shift of the operating point does not occur in synchronism with the change in RF amplitude.

SUMMARY OF THE INVENTION

It is an object of the present invention to reduce the distortions occurring during amplification which, in the end stage of a single sideband transmitter become more pronounced, the more curved its gain characteristic, without significantly increasing the power losses.

The above and other objects are achieved, according to the invention, in a transmitter of amplitude modulated single sideband signals, which transmitter includes an output stage connected to receive, and effect substantially linear amplification of a single sideband input signal, the output stage having a nonlinear gain characteristic, and a reactance network tuned to the single sideband frequency and connected to the output of the output stage by providing the transmitter with control means connected to the output stage for controlling the current flow (i.e. conduction) angle at its output in a manner to increase the current flow angle as the amplitude of the input signal decreases, the control means being constructed and connected for controlling the output current flow angle in a substantially synchronous, undelayed and hysteresis free manner as function of the envelope of the single sideband input signal, and for varying the output current flow angle down to values corresponding to class C amplifier operation for the highest single sideband input signal amplitude. The present invention permits reduction of distortions which occur independently of the curvature in the characteristic curve of the output stage whenever the operating voltage of the output stage is controlled in synchronism with the envelope of the single sideband signal in order to reduce power losses, and preferred embodiments employ a switching amplifier that operates with pulse length modulated pulses for this purpose.

The invention and a preferred embodiment thereof will be explained in greater detail with the aid of the accompanying drawings in which:

BRIEF DESCRIPTION OF THE DRAWINGS

FIG. 1 is a schematic diagram of a prior art single sideband transmitter output stage;

FIG. 5 is a block circuit diagram of a preferred embodiment of the invention; and FIG. 6 is a detail view of a portion of the circuit of FIG. 5.

DESCRIPTION OF THE PREFERRED EMBODIMENTS

Figure 2:
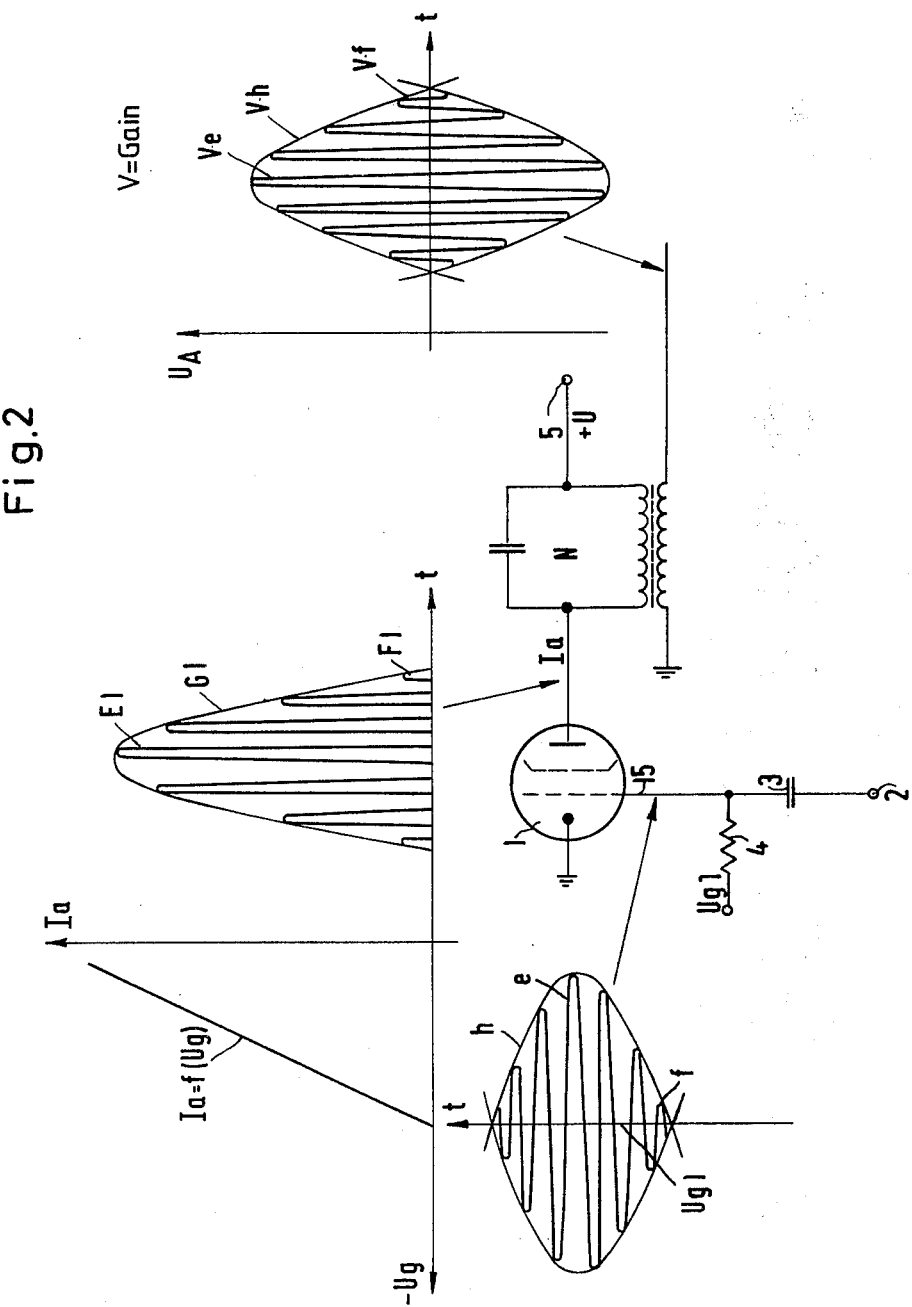
FIG. 2 is an explanatory schematic and signal diagram of a single sideband transmitter output stage.

Referring now to FIG. 1, there is shown a transmitter tube 1 operating in the class B mode which receives from an input terminal 2 through a capacitor 3 a single sideband signal Ug at its control grid, 15, which signal has an envelope curve h. In FIG. 1, this single sideband signal is plotted to the left of the input terminal 2 as a function of time t, two representative modulated carrier cycles e and f being emphasized by heavy lines. The control grid 15 of the transmitting tube 1 is biased through a resistor 4 with a D.C. voltage Ug1 so that at the control grid the single sideband signal is present as the control signal and the superposition of the single sideband signal Ug with the grid bias Ug1 provides the control parameter.

An anode current Ia, which, because of the class B tube operation, has a constant current flow angle of 180°, flows to the anode of the transmitter tube 1 from a terminal 5 having the voltage U through a network N which is tuned to the single sideband center frequency. The network includes a transformer T from which an output voltage UA is fed to an antenna A.

FIG. 2 shows an idealized Ug/Ia characteristic curve for the transmitter tube 1 and illustrates how the controlling single sideband signal Ug is converted, as a function of time, at the control grid of the transmitter tube 1 into an anode current Ia. This produces, from the input envelope curve h, an output envelope curve G1 for the anode current Ia. From the representative individual cycles e and f, half-waves E1 and F1 respectively are formed at the output. It can be seen that the positive half-waves of the control signal Ug, due to the linear form of the amplifier characteristic curve are amplified linearly. The network N assures that only those frequency components of the Ia output waveform which fall into the single sideband are converted into an output voltage $U_A$ across the transformer T and the antenna A. The D.C. voltage component and the harmonics of the RF waveform (single sideband) are filtered out, so that the voltage across the antenna A is again exactly proportional to the single sideband signal at the input.

Figure 3:
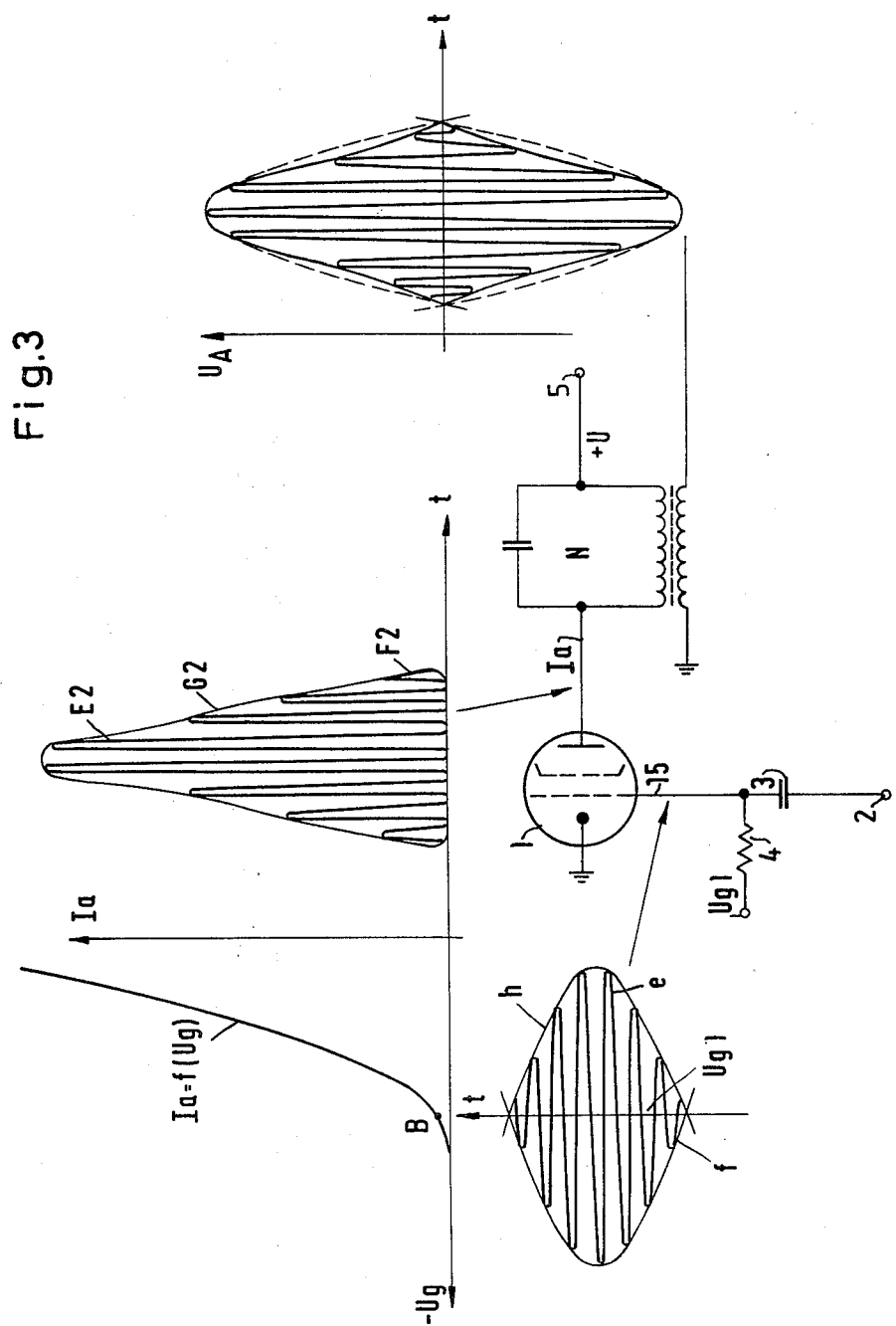
FIG. 3 is an explanatory diagram similar to FIG. 2.

In reality, however, conditions are not that ideal, as can be seen in FIG. 3, where the corresponding modulation curves are shown for a more realistic Ug/Ia characteristic curve. The representative individual cycle e becomes a wave E2 at the output and cycle f becomes wave F2 so that the envelope h at the input becomes a current envelope curve G2. It can be seen that this envelope G2 deviates considerably from the envelope G1 in FIG. 2. As a consequence thereof, the voltage across the antenna A has an envelope curve which is distorted compared to the envelope curve h at the input. The reason for this undesirable shape of the envelope G2 is that, due to the curvature of the amplifier characteristic curve, a greater steepness results ultimately at the operating or bias, point B with a larger modulation (e) than with a smaller modulation (f). This is not changed essentially either if the operating point B is shifted even further to the left as viewed in FIG. 3.

Figure 4:
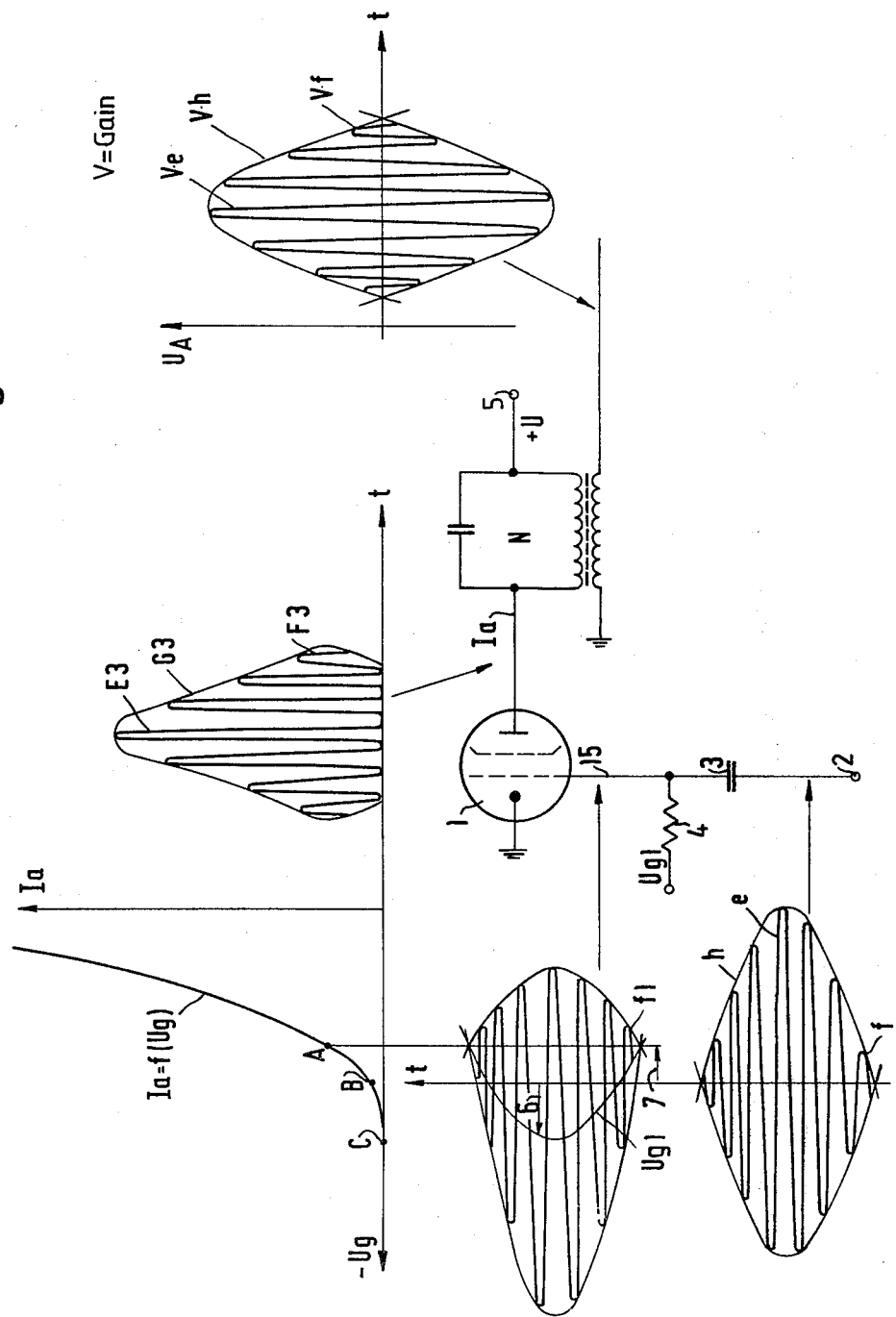
FIG. 4 is an explanatory schematic diagram illustrating the present invention.

FIG. 4 illustrates how the undesirable distortions can be reduced with the aid of the present invention. Depending on the magnitude of the amplitude of the individual cycles e, to be amplified, different current flow angles result because the operating point is shifted on the characteristic curve. For the representative cycle e the operating or quiescent point is at point C so that the transmitter tube operates in the class C mode. Correspondingly, the output wave E3 has a current flow angle of less than 180°. For the representative cycle f with its smaller amplitude, the operating point shifts towards B as indicated in FIG. 4 by arrow 6. The cycle f then takes on the position f1 so that at the output there is a resultant wave F3. If the amplitude of the amplifier input, or grid control, signal drops to zero, the operating point shifts toward point A as indicated by arrow 7, corresponding to class A operation. In this way, an envelope curve G3 is produced for the anode current Ia which curve assures that the envelope curve of the voltage $U_A$ across the antenna A is substantially less distorted with respect to the envelope curve h of the control waves than in the arrangement of FIG. 3.

It can be seen that in the mode of operation according to FIG. 4, more power is lost with smaller modulations, i.e. for an operating point corresponding to class A operation than for class B operation. However, this drawback is compensated for in that for large modulations (e) tube operation occurs in the class C mode i.e. with very little power loss. A further improvement of efficiency is realized as will be shown later by an additional co-modulation of the anode voltage. In the block circuit diagram of FIG. 5 there is shown a transmitter constructed in accordance with a preferred embodiment of the invention.

In order to generate the grid control signal required at terminal 2 in the form of a single sideband modulation, a mixer stage 9 is provided in a known manner at the audio frequency input 8, a carrier frequency being fed to the mixer stage 9 through terminal 10. The modulator or mixer stage 9 is connected in series with a bandpass filter 11 in order to suppress the undesired sideband. The single sideband signal 12 appears at the output of filter 11 which has already been shown in FIG. 1 with the envelope h. Such an envelope h results, for example, during modulation with two successive audio frequency cycles having the same amplitude. For multi-sound modulation at different amplitudes, the dotted envelope curve h' may result. The single sideband filter 11 is then followed finally possibly through further amplifiers, by a driver amplifier 13 which furnishes the control signal for the grid 15 of output tube 1.

To initially reduce the distortions occurring in the output tube 1 due to its curved gain characteristic, means are provided for controlling the operating point of the output stage tube 1. In principle, the relationships of FIG. 4 can be established so that the single sideband signal 12 characterized by the envelope curves h or h' can be reproduced as linearly as possible with the tuned reactance network N. This is accomplished if the fundamental wave amplitudes of the controlling single sideband result in fundamental voltage amplitudes for the various frequencies and amplitudes occurring in the network N which amplitudes are increased by an essentially constant factor.

The above-mentioned operating point control means include an envelope detector 14 which receives the single sideband 12 and, also in the simplest case, a series-connected heterodyning point at the input 15 to the control grid of the output stage tube 1, if the output signal 16 of the envelope detector 14 has the correct polarity. This depends on the type of amplifying element tube, pnp or npn transistor used for the output stage. In the present case, the polarity of the output signal 16 of the envelope detector 14 is additionally inverted by an inverting amplifier 17. Moreover a D.C. voltage Ug1 is additionally supplied through a resistor 18 at the heterodyning point 15, so as to be able to set the correct basic setting for the operating point of the output stage tube 1. At the heterodyning point 15, a signal 19 results as the total control parameter in which, however, the voltage Ug1 is not considered.

In this way, the operating point of the output stage tube 1 operating in a single-ended mode is controlled in synchronism, without delay and without hysteresis in accordance with the envelope curve h or h′ of the control signal 12. Care must of course be taken that the travel times from the branch point 20, to which the input of detector 14 is connected, are the same for the path 20-13-2-3-15 of the control signal 19 as for the operating point control path 20-14 . . . 17-15.

The envelope detector 14 is now connected in series, possibly indirectly, with a predistorter 21 which may become necessary if the linearity with respect to the envelope of the output stage 1 should not be sufficient. A diode distorter with a curved characteristic curve as determined by measurement and depending on the gain characteristic of the transmitter tube 1 can be used as the predistorter 21.

At this point there arises the question as to whether it might not be simpler to omit the operating point control path 20-14-21-17-15 and to use instead a suitable predistorter in the audio frequency or single sideband signal path 8-9-11 . . . 13 . . . 15. This would be possible, in principle, but would be very expensive since a very strong predistortion would be required, which may result in an influence on the phase modulation occurring during single sideband modulation.

In contradistinction thereto, the predistorter 21 connected to the output of the envelope detector 14 need perform only a slight amount of predistortion which can be managed much more easily.

Aside from the linearization of the gain of the RF output stage, the control of the operating point also has an additional significance within the scope of the circuit arrangement not yet described in detail.

In order to reduce power loss in the output stage tube 1, its anode voltage is controlled in synchronism with the envelope curve h or h′. This cocontrol means includes a power amplifier 22 whose output is connected to the terminal 5 and which is controlled, preferably indirectly, by the output signal of the envelope detector 14. The power amplifier 22 is thus controlled by a signal 23 and furnishes the amplified voltage curve 24 as the operating voltage for the output stage tube 1. Thus the operating voltage of the output stage tube 1 is reduced whenever the amplitude of the envelope curve h or h′ is diminished. This changes nothing in the anode current curve Ia of FIG. 4. The cocontrol of the anode direct voltage does not serve for modulation purposes but only to improve efficiency. The anode voltage curve is shown in FIG. 5 at 25, the dot-dash line indicating the average value filtered out by the reactance network N because the fundamental waves and the harmonics of this average value lie in the low frequency audio frequency range. The anode voltage always drops only to the extent that the RF signal does not yet fully drive the tube 1 to the residual voltage.

FIG. 6 shows a preferred arrangement for the power amplifier 22 which, beginning with a tap 26, also shown in FIG. 5, includes a pulse duration modulator (PDM) 27 and a series connected amplifier 28. The amplifier 28 controls a switching tube 29 which, together with an idling diode 30 and a series-connected lowpass filter 31 forms a switching amplifier. This switching amplifier is referred to as a modulation amplifier and is described in German Pat. No. 1,218,557. Its operation is described in an easily understood manner in Rundfunktechnische Mitteilungen [Radio Engineering News] Volume 21, 1977, No. 4, at pages 153–157.

Operating voltage for the tube 29 is supplied to the terminal 32 and from there a current flows, depending on the switching state of the switching tube 29, through either the one or the other turn of a storage coil 33. A capacitor 34 establishes the connection for harmonics of the switching frequency (e.g. 54 kHz) between the two turns. This is necessary since it is practically impossible to establish 100 percent coupling between the turns of the storage coil 33.

It is now been found that the cocontrol of the anode voltage by the voltage signal 24 of FIG. 5 may produce additional distortions in the envelope curve of the single sideband as amplified by the output stage tube 1. The cause of this is the retroactive effect of the anode voltage (terminal 5) on the control parameter at the control grid of tube 1. If a switching amplifier is used as the power amplifier 22, there will also be a retroactive effect on this amplifier itself in such a manner that annoying transient behavior occurs particularly in the lowpass filter 31.

It has now been found that these effects can be favorably influenced by the cocontrolled anode voltage with the means for controlling the tube operating point. These means thus serve a dual purpose if the anode voltage is cocontrolled.

However, in meeting this dual purpose it has been found that, even independently of the characteristic curve of the transmitter tube 1, the selection of the gain of the amplifier 17 and of the predistorter 21 as well as the grid bias Ug1 must be somewhat different depending on whether optimization is to be realized with respect to those distortions which are caused by the curved characteristic curve of the power tube 1 or whether transient behavior in the power amplifier 22 of FIG. 6 is to be substantially avoided. This transient behavior is based on the fact that the lowpass filter 31 in FIG. 6 is mismatched by the transmitting tube 1 because the transmitting tube 1 is not driven to the residual voltage. The internal resistance of the transmitting tube 1 is then no longer small enough to sufficiently attenuate transient behavior in the switching amplifier 22 of FIG. 6. In order to always terminate the amplifier 22 of FIG. 6 with the desired resistance, the operating point of the transmitter output stage tube 1 must be shifted to class A operation with decreasing RF actuation. In this way, the D.C. anode current can be made to change proportionally with the output voltage of the amplifier 22, i.e. the load resistance of the switching amplifier 22 is constant.

The control of the transmitter tube operating point for matching the amplifier 22 has priority in designing the circuit before linearization of the gain of the transmitter output tube 1. The tube characteristic curve determines if there is an incomplete compensation or overcompensation of the distortions of the transmitter tube 1.

In order to properly terminate the amplifier 22 and simultaneously reduce the distortions of the envelope at antenna A to the smallest possible value, there is the possibility of feeding through an additional line 35, as shown in FIG. 5, the output signal of the amplifier 17, which controls the operating point shift, possibly with reversed polarity, to the control, or input, electrode of the driver amplifier 13. In a driver amplifier, a reduction of efficiency due to shifting of the operating point in the direction toward class A operation with small modulation need not be considered as carefully as for output stage tube 1. The line 35 thus makes it possible to design the mode of operation of the output stage tube 1 more in accordance with the aspect of improving efficiency and for countering the transient behavior in the switching amplifier 22 while compensation for residual distortions can be effected by controlling the operating point in the driver amplifier 13 and in the predistorter 21. Such a predistorter may also be added additionally to line 35 or as a replacement for the predistorter 21 of FIG. 5.

An adjustable clipper 36 is also provided between the envelope detector 14 and the junction 26. The adjustable clipper 36 cuts off the lower extremities of the positive half-waves of the envelope curve h or h' of the signal 16. Thus on the one hand, the operating point of the output stage tube 1 is not driven too far into the positive region, i.e. not too far into class A operation, because this has been found not to be necessary. Moreover, these tips or peaks are also cut off for the signal 23, which is of advantage for the switching amplifier of FIG. 6 if it is to serve as power amplifier 22 because the switching amplifier need not transmit such a high proportion of harmonics as would be the case with the peaks of the half-waves of the envelope curve h. By selection of the limiter 36, the termination of the amplifier 22 of FIG. 6 can be improved further and it is possible, particularly when modulation takes place with frequencies at the upper low frequency band limit, to obtain a minimum of distortion.

Using suitable circuit design, precautions are taken that the signal travel times of the amplifier 22, of the RF preamplifier 21, 17 and of the grid control 21, 17 are matched to one another in such a manner that no noticeable/mutual phase shifts occur at the transmitter output tube 1.

It will be understood that the above description of the present invention is susceptible to various modifications, changes and adaptations, and the same are intended to be comprehended within the meaning and range of equivalents of the appended claims.

What is claimed is:

1. In a transmitter of amplitude modulated single sideband signals, which transmitter includes an output stage having a control electrode connected to receive a single sideband input signal having an envelope curve, the output stage having a nonlinear gain characteristic and effecting substantial linear amplification of the single sideband input signal, and a reactance network tuned to the single sideband frequency and connected to the output of the output stage, the improvement wherein;

said transmitter further comprises control means connected to said output stage for controlling the current conduction angle at the output of the output stage in a manner to increase the current conduction angle as the amplitude of the input signal decreases;

said control means including signal conduction means for applying the single sideband input signal and a signal derived from the envelope curve of the single sideband input signal to the control electrode of said output stage without any substantial relative phase shift and in a hysteresis free manner; and said control means further including current conduction angle varying means for varying the output current conduction angle down to values corresponding to class C amplifier operation for the highest single sideband input signal amplitudes.

2. A transmitter as defined in claim 1 wherein said control means operate to control the current conduction angle up to class A operation for the smallest amplitudes of the single sideband input signal.

3. A transmitter as defined in claim 1 wherein the envelope curve of the single sideband input signal has the form of half-waves and further comprising cocontrol means connected for operating in conjunction with said control means for controlling the operating voltage of said output stage, and an inverse limiter connected to at least one of said control means and said cocontrol means to suppress the half-waves of the envelope curve of the single sideband input signal in the region where the waves of the single sideband input signal have very small amplitudes.

4. A transmitter as defined in claim 1 wherein said control means operate to provide a signal having an envelope curve at the output of said output stage, which is enlarged by an essentially constant factor in comparison with the single sideband input signal envelope curve.

5. A transmitter as defined in claim 4 wherein said control means comprise an envelope detector connected to receive the single sideband input signal and a predistorter connected to said envelope detector for predistorting the signal which it receives in a manner to control the current conduction angle whereby the envelope curve of the single sideband input signal appears at the output of said output stage as a voltage envelope curve that is essentially linearly amplified.

6. A transmitter as defined in claim 1 wherein said control means comprise means connected for additively superposing the single sideband input signal and the signal derived from the single sideband input signal envelope curve and for feeding the superposed signals to the control electrode of the output stage.

7. A transmitter as defined in claim 5 or 6 further comprising cocontrol means connected to operate in conjunction with said control means for controlling the operating voltage of said output stage whereby said operating voltage corresponds essentially to the path of the envelope curve of the single sideband input signal.

8. A transmitter as defined in claim 7 wherein said cocontrol means include a pulse duration modulator, a filter member and a switching amplifier connected between said pulse duration modulator and said filter member.

9. A transmitter as defined in claim 8 wherein said control means operate to cause the output current of said switching amplifier to change proportionally with the output voltage of said output stage to the extent that transient behavior in said switching amplifier is avoided.

* * * * *